(12) United States Patent
Yap et al.

(10) Patent No.: US 9,709,711 B1
(45) Date of Patent: Jul. 18, 2017

(54) WAVELENGTH SELECTIVE OPTICAL DIFFUSER

(71) Applicant: HRL Laboratories, LLC, Malibu, CA (US)

(72) Inventors: Daniel Yap, Newbury Park, CA (US); Hasan Sharifi, Agoura Hills, CA (US); Don F. Weston, Port Hueneme, CA (US); Rajesh D. Rajavel, Oak Park, CA (US)

(73) Assignees: HRL Laboratories, LLC, Malibu, CA (US); The Boeing Company, Chicago, IL (US)

( * ) Notice: Subject to any disclaimer, the term of this patent is extended or adjusted under 35 U.S.C. 154(b) by 513 days.

(21) Appl. No.: 14/030,485

(22) Filed: Sep. 18, 2013

(51) Int. Cl.
*G02B 27/36* (2006.01)
*G02B 5/02* (2006.01)
*B44C 1/22* (2006.01)

(52) U.S. Cl.
CPC .............. *G02B 5/021* (2013.01); *B44C 1/227* (2013.01)

(58) Field of Classification Search
CPC ........ G02B 5/02; G02B 5/0205; G02B 5/021; G02B 5/0215; G02B 5/0221; G02B 5/0226; G02B 5/0231; B44C 1/22
USPC ............................ 359/599, 491.01, 885, 891
See application file for complete search history.

(56) References Cited

U.S. PATENT DOCUMENTS

| | | | | |
|---|---|---|---|---|
| 5,861,990 A | * | 1/1999 | Tedesco | G02B 5/0221 359/599 |
| 5,867,321 A | * | 2/1999 | Nakama | G02B 3/0012 359/619 |
| 6,882,409 B1 | | 4/2005 | Evans et al. | |
| 7,033,736 B2 | | 4/2006 | Morris et al. | |
| 7,575,191 B2 | | 8/2009 | Layton | |
| 7,842,908 B2 | | 11/2010 | Andresson | |
| 7,858,939 B2 | | 12/2010 | Tener et al. | |

(Continued)

FOREIGN PATENT DOCUMENTS

WO    2014175933 A2    10/2014

OTHER PUBLICATIONS

C. Y. Wu, T. H. Chiang and C. C. Hsu, "Fabrication of microlens array diffuser films with controllable haze distribution by combination of breath figures and replica molding methods," Optics Express, vol. 16, pp. 19978-19986 (2008).

(Continued)

*Primary Examiner* — Scott J Sugarman
*Assistant Examiner* — Robert E Tallman
(74) *Attorney, Agent, or Firm* — Ladas & Parry (57) ABSTRACT

A wavelength-selective optical diffuser comprising a substrate of a first material having opposite first and second surfaces, wherein said first material is transparent to a first wavelength $\lambda_S$ and a second wavelength $\lambda_L$, with $\lambda_L > 4\lambda_S$; at least a first surface of said substrate having a surface relief such that a beam of light having the first wavelength $\lambda_S$ is diffused, with a rms phase delay $S > \pi/4$, when traversing said substrate; and a beam of light having the second wavelength $\lambda_L$ is minimally diffused, with a rms phase delay $S < \pi/4$, when traversing said substrate.

32 Claims, 9 Drawing Sheets

(56) References Cited

U.S. PATENT DOCUMENTS

| | | |
|---|---|---|
| 8,274,027 B2 | 9/2012 | Andressen et al. |
| 9,134,463 B2 * | 9/2015 | Kim .................... G02B 3/0037 |
| 9,194,751 B1 | 11/2015 | Yap et al. |
| 2010/0127174 A1 | 5/2010 | Tener et al. |
| 2011/0073704 A1 | 3/2011 | Jenkins et al. |
| 2012/0074295 A1 | 3/2012 | Andressen et al. |
| 2014/0071695 A1 * | 3/2014 | Chen .................... G02B 3/0056 |
| | | 362/311.02 |

OTHER PUBLICATIONS

S-I. Chang, J-B.Yoon, H. Kim, J-J.Kim, B-K.Lee and D.H. Shin, "Microlens array diffuser for a light-emitting diode backlight system," Optics Letters, vol. 31, pp. 3016-3018 (2006).

T. R. M. Sales, S. Chakmakjian, G. M. Morris and D. J. Schertler, "Light Tamers," Photonics Spectra, Jun. 2004, Laurin Publishing.

L. G. Shirley and N. George, "Diffuser radiation patterns over a large dynamic range. 1: Strong diffusers," Applied Optics, vol. 27, pp. 1850-1861 (1988).

E. R. Mendez, et al., "Photofabrication of random achromatic optical diffusers for uniform illumination," Applied Optics, vol. 40, pp. 1098-1108 (2001).

R. Bitterli, et al., "Fabrication and characterization of linear diffusers based on concave micro lens arrays," Optics Express, vol. 18, pp. 14251-14261 (2010).

From U.S. Appl. No. 14/030,670 (now U.S. Pat. No. 9,194,751) Notice of Allowance dated Aug. 7, 2015.

From U.S. Appl. No. 14/030,670 (now U.S. Pat. No. 9,194,751) Office action dated Jun. 9, 2015.

* cited by examiner

FIG. 1A

PRIOR ART

PRIOR ART

PRIOR ART

FIG. 2A

PRIOR ART

FIG. 2B

PRIOR ART

PRIOR ART

WAVELENGTH SELECTIVE OPTICAL DIFFUSER

TECHNICAL FIELD

The present disclosure relates to transmissive optical diffusers that diffuse traversing light having a shorter wavelength but transmit with minimal effect light having a longer wavelength. The present disclosure also relates to reflective optical diffusers that selectively diffuse reflected light.

BACKGROUND

Known optical diffusers have various surface profiles. For example, some diffusers comprise a plurality of microlenses that have a convex outline, as illustrated in FIGS. 1A to 1D (see C. Y. Wu, T. H. Chiang and C. C. Hsu, "Fabrication of microlens array diffuser films with controllable haze distribution by combination of breath figures and replica molding methods," Optics Express, vol. 16, pp. 19978-19986 (2008); or S-I. Chang, J-B. Yoon, H. Kim, J-J. Kim, B-K. Lee and D. H. Shin, "Microlens array diffuser for a light-emitting diode backlight system," Optics Letters, vol. 31, pp. 3016-3018 (2006); or T. R. M. Sales, S. Chakmakjian, G. M. Morris and D. J. Schertler, "Light Tamers," Photonics Spectra, June 2004, Laurin Publishing.

Figure 1A:
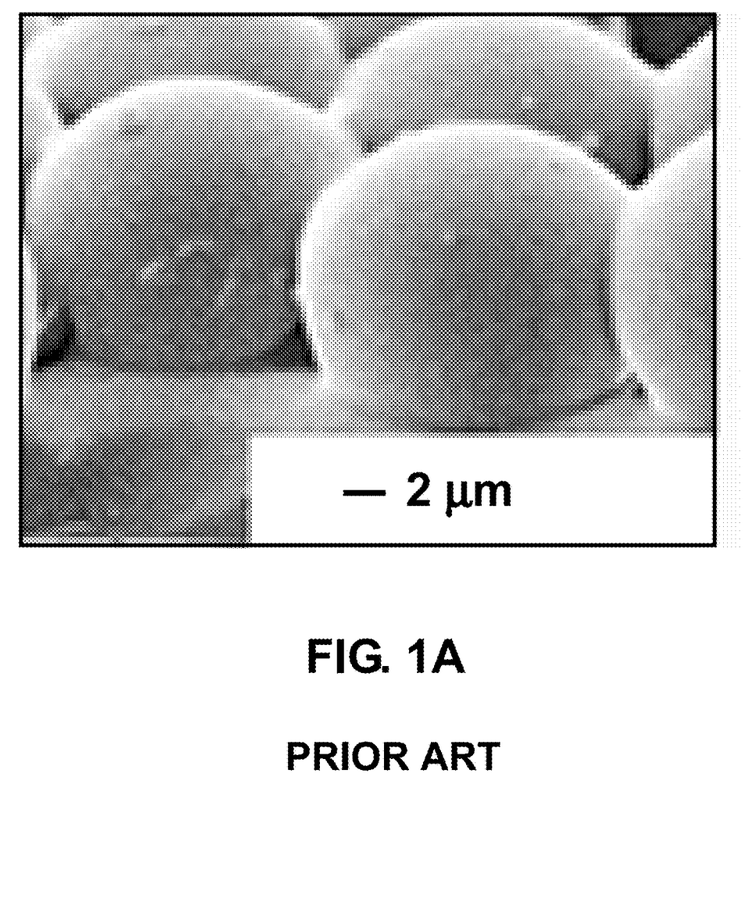
FIGS. 1A to 1D show picture of known light diffusers using arrays of convex lenses.
Figure 1B:
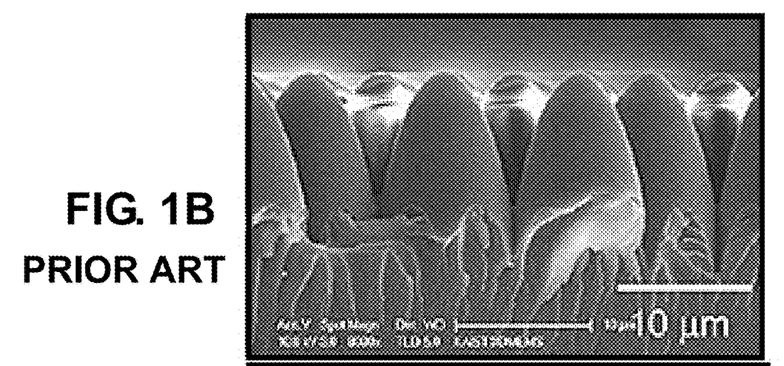
Figure 1C:
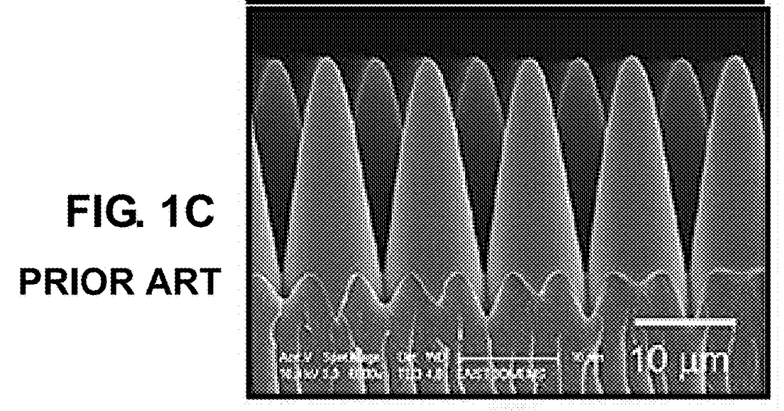
Figure 1D:
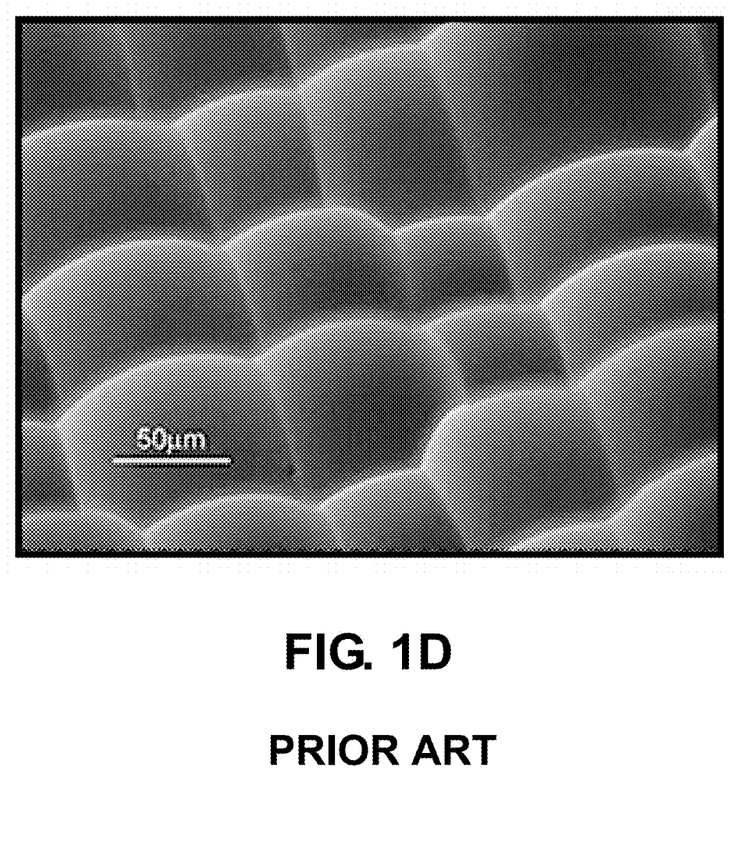

A number of known optical diffusers are fabricated in glass, fused silica or plastic (polymer) materials as for example the diffusers shown in FIGS. 1A to 1C. These diffusers are intended for use at visible wavelengths (i.e., wavelengths of 0.45-0.65 μm). FIG. 1A shows a top-view photograph and a projection photograph of an array of partially spherical convex lenses having radii of curvature of about 3 μm and having a width, and center-to-center distance of approximately 6 μm. FIG. 1B shows a side-view photograph of an array of sugar-loaf shaped convex lenses having a height of about 10 μm and having a width and center-to-center distance of approximately the same dimension. FIG. 1C shows a side-view photograph of an array of conical convex lenses having a height of about 25 μm and having a width and center-to-center distance of approximately 10 μm. FIG. 1D shows a projection photograph of an array of partially spherical convex lenses having various radii of curvature larger than 100 μm and having center-to-center distances of 50-100 μm, with a lateral coherence length of those surface-feature variations being greater than 50 μm. Other known examples (not shown in the drawings) comprise engineered diffusers made by the company commercially known as RPC Photonics Incorporated for diffusing visible wavelength light (see G. M. Morris and T. R. M. Sales, "Structured screens for controlled spreading of light," U.S. Pat. No. 7,033,736 B2 (2006)).

Figure 2A:
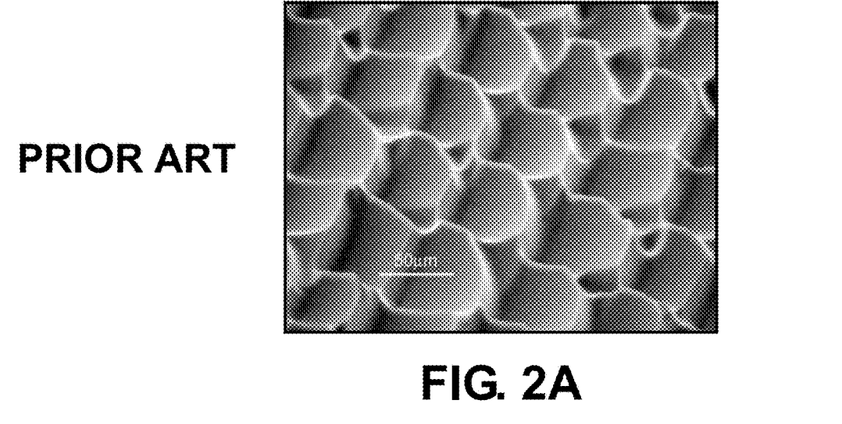
FIGS. 2A to 2C show picture of known light diffusers using arrays of concave lenses.
Figure 2B:
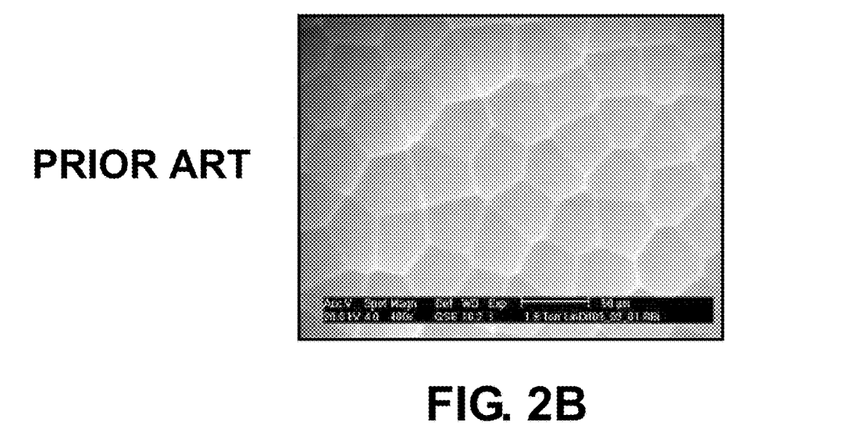
Figure 2C:
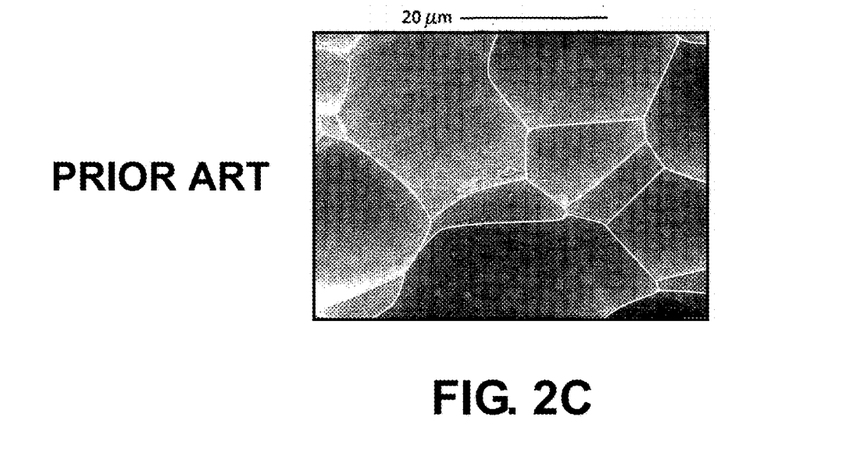

Other known diffusers comprise concave microlens arrays, as for example illustrated in FIGS. 2A-2C. FIG. 2A is a projection photograph of an array of partially spherical concave lenses having a radius of curvature larger than 25 μm and having center-to-center distances that are about twice that dimension. FIGS. 2B and 2C are top-view photographs of arrays of partially spherical concave lenses having a radius of curvature larger than 25 μm and having a center-to-center distance of 20-50 μm.

In order to produce a uniform spread of the beam of light, a surface-relief pattern consisting of lenses having a random variation or an engineered variation in the sag and in the spacing between adjacent lenses can be preferred to a pattern that has lens features with uniform shape and spacing (see also L. G. Shirley and N. George, "Diffuser radiation patterns over a large dynamic range. 1: Strong diffusers," Applied Optics, vol. 27, pp. 1850-1861 (1988) or E. R. Mendez, et al., "Photofabrication of random achromatic optical diffusers for uniform illumination," Applied Optics, vol. 40, pp. 1098-1108 (2001).)

Figure 3A:
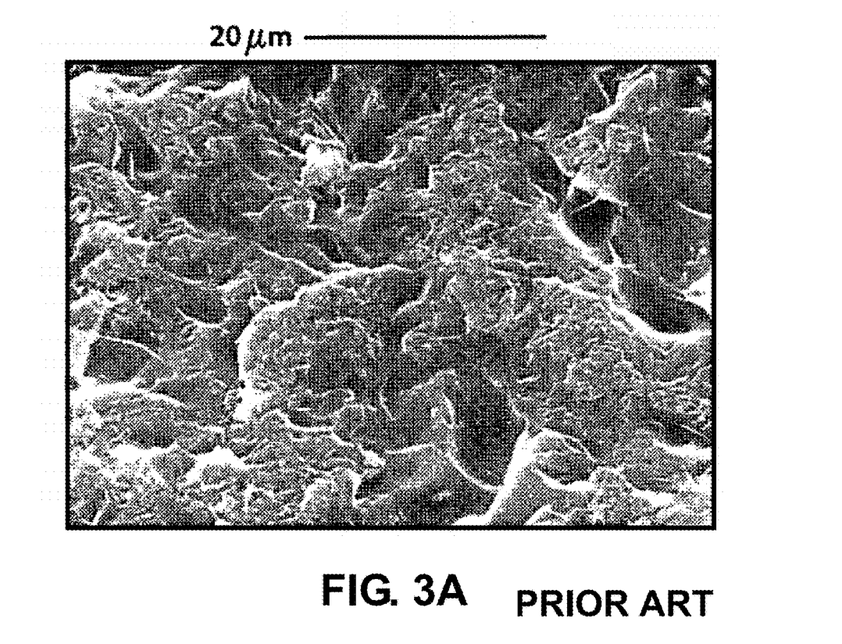
FIG. 3A shows a picture of the surface of a ground glass known diffuser.

Surface reliefs having other shapes than rounded convex or concave lenses also have been used for diffusers. For example, known diffusers are made from ground glass. FIG. 3A shows a projection photograph of a ground glass surface. The ground glass surface has prominent discontinuities and has features with high spatial frequency.

Figure 3B:
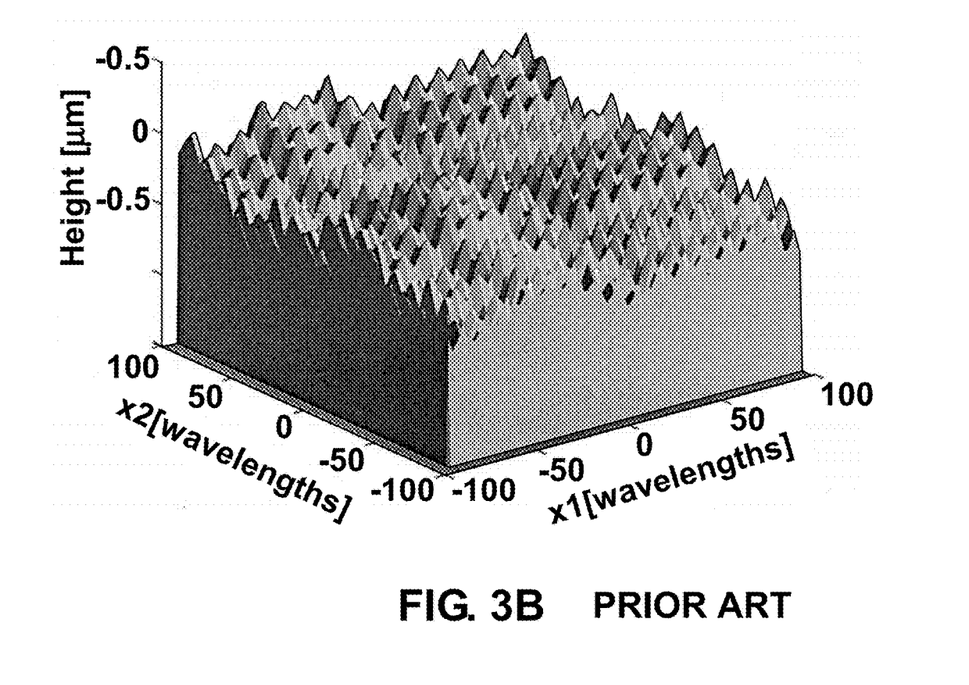
FIG. 3B shows a known diffuser that comprises a pattern of cones or pyramids with various heights and base widths.

FIG. 3B shows a projection drawing of another known diffuser that comprises a pattern of cones or pyramids that have various heights and base widths. The heights of these cones are several times the wavelength of the light, and the base width of the cones as well as the variation in the vertical positions of the tips of the cones are at least 5-10 times the wavelength of the light.

The Inventors have noted that the known diffusers diffuse light over a wavelength range that is too broad for some applications, and that there exists a need for selective diffusers that efficiently diffuse traversing light having wavelengths within a band or range of shorter wavelengths but transmit with minimal effect light having wavelengths within a band or range of longer wavelengths.

Figure 4:
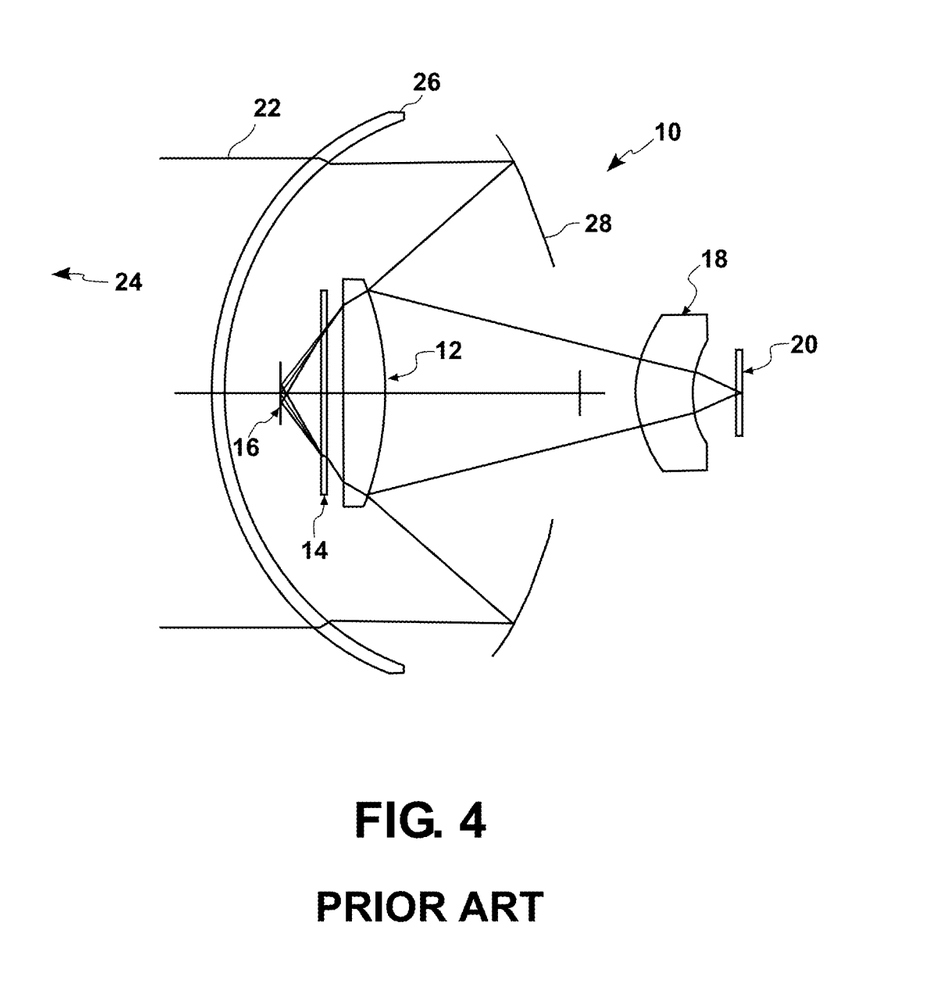
FIG. 4 shows schematically a dual mode optical seeker using a known optical diffuser.

As an example, FIG. 4 illustrates a dual mode optical seeker 10 wherein a wavelength selective mirror and lens 12 transmits light having a first wavelength to a diffuser 14 and a first sensor 16, and reflects light having a second wavelength to a lens 18 and a second sensor 20. Incoming light 22 from a scene 24 (not shown) that is illuminated partially by a laser source is reflected to the wavelength selective mirror 12 by a set of reflective optical elements 28. Because the diffuser 14 is not sufficiently wavelength selective, the wavelength selective mirror and lens 12 must separate out the second-wavelength light so that it is not coupled to the diffuser 14. Only the first-wavelength light is directed by wavelength selective mirror 12 to pass through diffuser 14 before reaching first sensor 16. A drawback of the structure illustrated in FIG. 4 is that, because it must place the first sensor 16 on the opposite side of wavelength-selective mirror 12 from the second sensor 20, part of the input aperture area is blocked. Thus, the overall diameter of the system must be larger in order to collect and project the desired amount of light onto the two sensors. The Inventors have determined that a selective diffuser that would efficiently diffuse traversing light having a shorter wavelength but would transmit light having a longer wavelength would allow making a more compact dual-mode optical seeker.

SUMMARY

An embodiment of the present disclosure relates to a wavelength-selective optical diffuser comprising: a substrate of a first material having a first surface, wherein said first material is transparent to a first wavelength $\lambda_S$ and a second wavelength $\lambda_L$, with $\lambda_L > 4 \cdot \lambda_S$; said first surface of said substrate having a surface relief such that a beam of light having the first wavelength $\lambda_S$ is diffused, with a rms phase delay $S > \pi/4$, when traversing said substrate; and a beam of light having the second wavelength $\lambda_L$ is minimally diffused, with a rms phase delay $S < \pi/4$, when traversing said substrate.

The wavelength-selective optical diffuser of claim 1, wherein said surface relief has a maximum width that is smaller than $\lambda_L/2$.

According to an embodiment of the present disclosure, said surface relief has a minimum width that is larger than $\lambda_S$.

According to an embodiment of the present disclosure, said surface relief has a minimum width that is larger than $\lambda_S/2$.

According to an embodiment of the present disclosure, said surface relief has a maximum height or depth that is smaller than $\lambda_L/(4 \cdot n)$, where n is the refractive index of said first material.

According to an embodiment of the present disclosure, said surface relief has a minimum height or depth that is larger than $\lambda_S/(4 \cdot n)$, where n is the refractive index of said first material.

According to an embodiment of the present disclosure, said surface relief is formed on one face of the substrate.

According to an embodiment of the present disclosure, said surface relief is formed on two opposing faces of the substrate.

According to an embodiment of the present disclosure, said surface relief includes protrusions and/or concave profiles.

According to an embodiment of the present disclosure, said protrusions and/or concave profiles form shapes including trenches, domes, cones, pyramids or bowls.

According to an embodiment of the present disclosure, a lateral dimension of said protrusions and/or concave profiles varies from one protrusion and/or concave profile to the next.

According to an embodiment of the present disclosure, said protrusions and/or concave profiles have a lateral coherence length of the surface-feature variation that is smaller than $3 \cdot \lambda_S$.

According to an embodiment of the present disclosure, said protrusions and/or concave profiles have a lateral coherence length of the surface-feature variation that is smaller than $\lambda_L/3$.

According to an embodiment of the present disclosure, said first material comprises a silica or polymer material, and wherein said surface relief comprises a random or pseudo-random pattern of cones, pyramids, rounded or convex bumps.

According to an embodiment of the present disclosure, said first material has high optical transparency for all wavelengths between 1 μm and 12 μm.

According to an embodiment of the present disclosure, said first material comprises InP or GaAs, and wherein said surface relief comprises a random or pseudo-random pattern of cones, pyramids, rounded or convex bumps.

According to an embodiment of the present disclosure, the first wavelength $\lambda_S$ is comprised between 1 and 2 μm, and the second wavelength $\lambda_L$ is larger than 8 μm.

Another embodiment of the present disclosure relates to a method of fabricating a wavelength-selective optical diffuser; the method comprising: providing a substrate of a first material having a first surface, wherein said first material is transparent to a first wavelength $\lambda_S$ and a second wavelength $\lambda_L$, with $\lambda_L > 4 \cdot \lambda_S$; forming on at least a first surface of said substrate a surface relief such that a beam of light having the first wavelength $\lambda_S$ is diffused, with a rms phase delay $S > \pi/4$, when traversing said substrate; and a beam of light having the second wavelength $\lambda_L$ is minimally diffused, with a rms phase delay $S < \pi/4$, when traversing said substrate.

According to an embodiment of the present disclosure, said surface relief has a maximum height or depth that is smaller than $\lambda_L/(4 \cdot n)$, where n is the refractive index of said first material.

According to an embodiment of the present disclosure, said surface relief has a maximum width that is smaller than $\lambda_L/2$.

According to an embodiment of the present disclosure, said surface relief has a minimum width that is larger than $\lambda_S$.

According to an embodiment of the present disclosure, said surface relief has a minimum width that is larger than $\lambda_S/2$.

According to an embodiment of the present disclosure, said surface relief has a minimum height or depth that is larger than $\lambda_S/(4 \cdot n)$, where n is the refractive index of said first material.

According to an embodiment of the present disclosure, said surface relief includes protrusions and/or concave profiles.

According to an embodiment of the present disclosure, said protrusions or concave profiles have a lateral coherence length of the surface-feature variation that is smaller than $3 \cdot \lambda_S$.

According to an embodiment of the present disclosure, said protrusions or concave profiles have a lateral coherence length of the surface-feature variation that is smaller than $\lambda_L/3$.

According to an embodiment of the present disclosure, said first material comprises GaAs, said forming a surface relief comprising performing an unmasked wet chemical etching of said first surface.

According to an embodiment of the present disclosure, said first material comprises InP, said forming a surface relief comprising performing an unmasked reactive ion etching of said first surface.

According to an embodiment of the present disclosure, the method further comprises: forming said surface relief by masked reactive ion etching using a mask containing features of non-uniform size and spacing.

According to an embodiment of the present disclosure, the method further comprises: performing a unmasked dry etching following the masked reactive ion etching.

An embodiment of the present disclosure also relates to a method for separating light comprising a first component having a first wavelength $\lambda_S$ and a second component having a second wavelength $\lambda_L$, with $\lambda_L > 4 \cdot \lambda_S$, into a first beam of diffused light having the first wavelength $\lambda_S$ and a second non-diffused or minimally diffused beam component having the second wavelength $\lambda_L$; the method for separating light comprising: fabricating a wavelength-selective optical diffuser according to the above fabrication methods; and directing light comprising said first and second components at said wavelength-selective optical diffuser.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as to not obscure the invention.

Ideally, a diffuser spreads or scatters normal incidence light over a broad angular range. The angular spread of the scattered light from the diffuser depends on factors such as the ratio between the lateral coherence length of the surface-feature variation, ω, and the wavelength of the light (i.e., ω/λ). The angular spread also depends on S, where S is the rms phase delay or root-mean-square (RMS) change in the phase of the light resulting from the features on the surface of the diffuser, which have a RMS variation in height described by $\sigma_h$, with:

$$S \simeq 2\pi \frac{\sigma_h}{\lambda}(n-1).$$

For a strong diffuser, S>>π/4. (see L. G. Shirley and N. George, "Diffuser radiation patterns over a large dynamic range. 1: Strong diffusers," Applied Optics, vol. 27, pp. 1850-1861 (1988)). On another hand, for a weak diffuser, S is smaller than π/4.

Figure 5A:
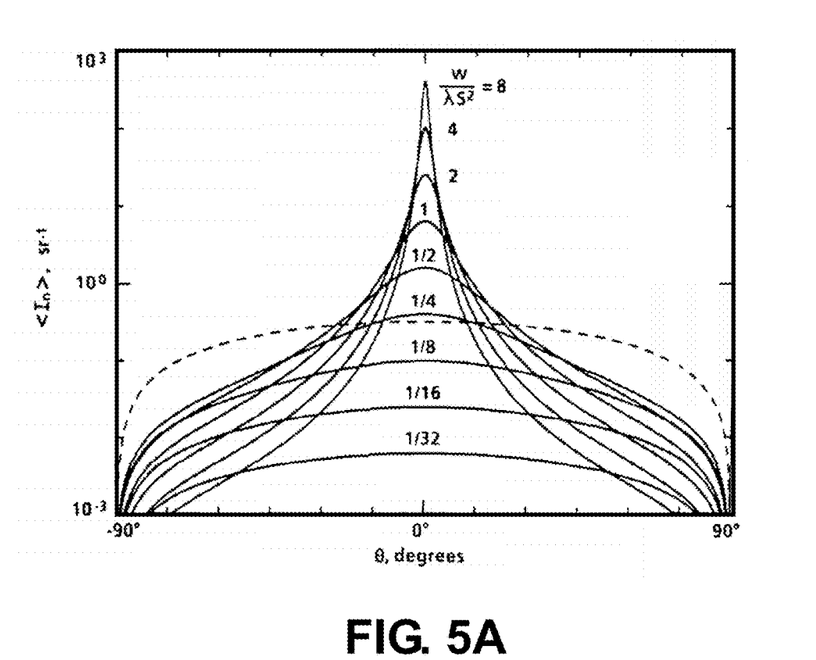
FIG. 5A illustrates the dependence of the angular spread of the scattered light on a shape parameter for pointed or cone-shaped features.

FIG. 5A shows analysis results from the above reference and contains plots of the dependence of the angular spread of the scattered light on a shape parameter: $\omega/\lambda S^2$ for diffusers having pointed or cone-shaped features.

Figure 5B:
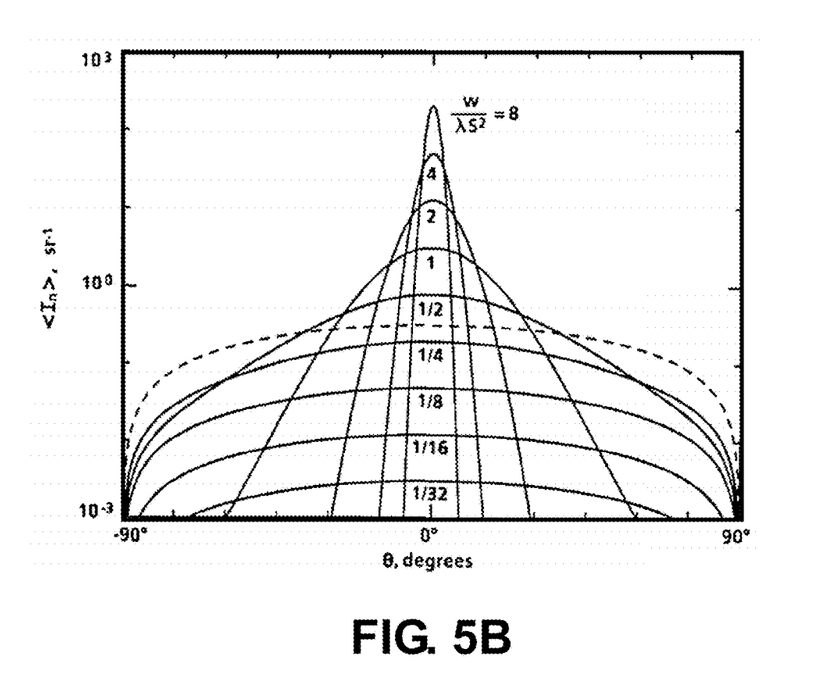
FIG. 5B illustrates a similar feature for a diffuser with more rounded or paraboloid-shaped features.
Figure 6A:
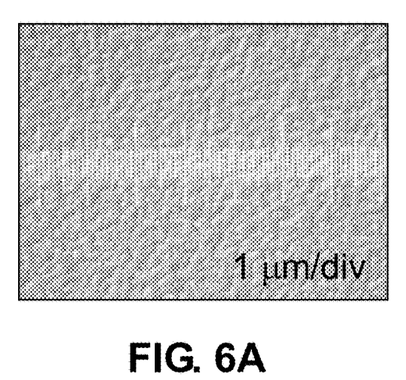
FIGS. 6A to 6D show photographs of a surface of diffusers according to embodiments of the present disclosure, having convex relief elements.
Figure 6B:
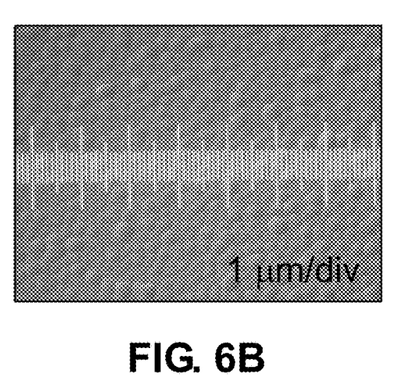
Figure 6C:
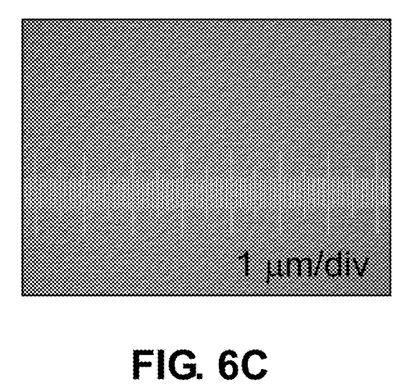
Figure 6D:
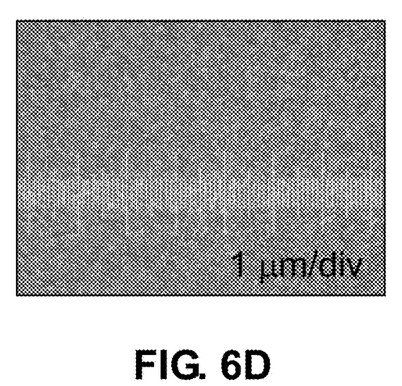

FIG. 5B shows similar analysis results (depending on a different shape parameter: ω/λS) for a diffuser with more rounded or paraboloid-shaped features. The paraboloidal shape is more indicative of the diffusers that have microlenses, except at the pointed junction between adjacent microlenses. The dashed line represents the angular intensity variation for an idealized Lambertian diffuser.

Assuming for example that n=1.5, which is approximately the refractive index of the glass or polymer materials, a nearly Lambertian diffuser can be achieved when the surface features have a lateral coherence length ω approximately equal to the value of the RMS height variation uh of these features. Generally, FIGS. 5A, 5B show that if the surface features vary gently (i.e., $\omega/\sigma_h$ is large), much of the light is not diffused. Conversely, if the surface features vary abruptly and those features are very tall or deep (compared to the scale of their lateral variation), the optical transmission through the diffuser is low. An intermediate value for $\omega/\sigma_h$, preferably between 1 and 0.1, is desired for the diffuser.

Further to the above considerations, the Inventors have noted that the pitch or center-to-center spacing between adjacent microlenses in the known optical diffusers having lenses is at least 10 times the wavelength of the light to be diffused or spread by the diffuser. The inventors have also noted that the height or the sag of the lens features is at least 5 to 10 times greater than the wavelength of the light to be spread by the diffuser.

Prior diffusers have microlens shapes and cone shapes whose widths and/or whose lateral coherence lengths are much larger than the wavelength of the light. Also, the vertical height or depth of those features is much larger than the wavelength of the light, to achieve the desired amount of diffusion or beam spreading. The Inventors have noted that, among known diffusers, only the ground glass diffusers have some features whose size can be comparable to or smaller than the optical wavelengths. However, other features on those ground glass diffusers are much larger than the optical wavelengths and, accordingly, the ground glass diffusers are not sufficiently wavelength selective but rather diffuse light over a broad wavelength range.

An embodiment of the present disclosure comprises a wavelength selective diffuser formed out of a substrate of a first material that is transparent to at least a first, shorter, wavelength $\lambda_S$ that is to be diffused when traversing the substrate and a second, longer, wavelength $\lambda_L$, that is to traverse the substrate substantially without being diffused. According to an embodiment of the present disclosure, $\lambda_L > 4 \cdot \lambda_S$. According to another embodiment of the present disclosure, $\lambda_L > 6 \cdot \lambda_S$. According to an embodiment of the present disclosure, at least one surface of the substrate has a surface relief with a maximum width that is smaller than $\lambda_L/2$. According to an embodiment of the present disclosure, the surface relief has a minimum width that is larger than $\lambda_S$. By surface relief with maximum and minimum widths, it is for example meant that the surface relief is comprised of juxtaposed elements having said maximum and minimum widths. According to an embodiment of the present disclosure, at least one surface of the substrate has a surface relief with a maximum height or depth that is smaller than $\lambda_L/(4 \cdot n)$, where n is the refractive index of the material of the substrate. According to an embodiment of the present disclosure, the surface relief has a minimum height or depth that is larger than $\lambda_S/(4 \cdot n)$. By surface relief with maximum and minimum heights or depths, it is for example meant that the surface relief is comprised of juxtaposed elements having each said maximum and minimum heights or depths.

For example, the longer wavelength $\lambda_L$ may be 8-12 μm and the shorter wavelength $\lambda_S$ may be 1-2 μm. According to an embodiment of the present disclosure, because of the large difference in the two optical wavelengths $\lambda_L$ and $\lambda_S$, a surface feature whose width or lateral dimension is one to three times the shorter wavelength $\lambda_S$ and whose height or depth is equal to or slightly smaller than one-half the shorter wavelength $\lambda_S$ will provide close to Lambertian diffusion for the shorter wavelength light, assuming the diffuser is made from a material whose refractive-index is sufficiently high (e.g., n>1.5). Because the vertical and lateral sizes of the surface features are barely noticeable at the scale of the longer wavelength light, S<π/4 for the light of the longer wavelength $\lambda_L$, a diffuser according to an embodiment of the present disclosure diffuses at most weakly the light of the longer wavelength $\lambda_L$.

According to an embodiment of the present disclosure, for the light with exemplary wavelengths of $\lambda_L$ of 8-12 μm and $\lambda_S$ of 1.0-1.5 μm, as detailed above, the surface of the diffuser comprises surface features whose lateral size or width lies in the range of 1-3 µm; the vertical size or height of the surface features being smaller than those dimensions.

FIGS. 6A to 6D show photographs of the surfaces of diffusers according to embodiments of the present disclosure, the surfaces of which have been formed by wet-chemical etching of a substrate of a III-V semiconductor material such as GaAs with an acid and water mixture. According to an embodiment of the present disclosure, using a III-V semiconductor material such as InP or GaAs is advantageous because its refractive index is high, whereby etched features forming the surface relief do not need to be very tall or deep to achieve strong spreading of the light. Also, those materials have strong transmission (i.e., high transparency, or a transmittance much greater than 0.5) for all wavelengths of light between 1 µm and >12 µm. The diffusers shown in FIGS. 6A-6D were made under different etching conditions and thus the specific shapes of their surface features differ. For most of the examples shown in FIGS. 6A-6D, the width, and the lateral coherence length of the surface features are smaller than 3 µm. The heights of these features vary and have a maximum value of approximately 1.0-1.5 µm, depending on the specific diffuser example. Thus, for these examples, S>5 and S could be as large as 12, indicative of strong diffusers. According to an embodiment of the present disclosure, the etched features of the relief have parabolic shapes. Assuming ω=3 µm, the value for the shape parameter (ω/λS) would be between ½ and ⅙. As indicated by the curves plotted in FIG. 5b, such features provides an efficient and low-loss beam spreading for light of 1-1.5 µm wavelength.

According to an embodiment of the present disclosure, small features such as obtained using wet-chemical and dry etching processes enable the fabrication of selective diffusers that selectively diffuse or spread light whose wavelength is 1-2 µm while also not diffusing or spreading light whose wavelength is >8 µm. Although the diffusers fabricated according to embodiments of the present disclosure are made using InP or GaAs substrates, the design principles described in the present disclosure are also applicable for diffusers made in other materials such as ZnSe, ZnS, chalcogenide glasses, silica glasses, polymers, silica, quartz as well as other semiconductor materials such as silicon and GaN.

The presently disclosed diffusers take advantage of wet-chemical and dry etching processes that enable one to define and form spatial features whose lateral size is smaller than 3 µm. For example, InP and GaAs can be etched by wet-chemical etchants such as HCl-containing and $H_2O_2$-containing mixtures, respectively. Silicon and silica materials can be etched by HF-containing mixtures. For dry etching processes, GaAs and InP can be etched by $Cl_2$ and/or $BCl_3$ radicals and ions. Silicon and silica can be etched by using $CF_4$, $SF_6$ and/or $CHF_3$; and polymers can be etched by using $O_2$.

The surface features according to embodiments of the present disclosure, as depicted in the photographs of FIGS. 6A to 6D, were formed by un-masked wet-chemical etching using a diffusion-limited etchant. According to another embodiment of the present disclosure, an un-masked dry etching process (reactive ion etching) can also be used to fabricate the relief of a diffuser according to the present disclosure.

Figure 7A:
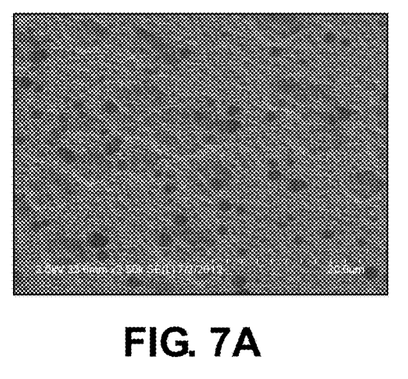
FIGS. 7A to 7B show photographs of a surface of diffusers according to embodiments of the present disclosure, having concave relief elements.
Figure 7B:
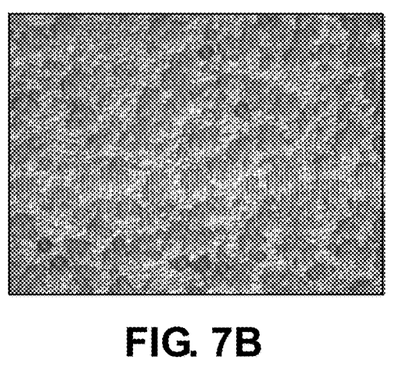

FIGS. 7A and 7B show photographs of surface features formed at the surface of a III-V semiconductor substrate such as an InP substrate by unmasked dry etching. The photograph of FIG. 7A was taken with a scanning electron microscope (SEM). Each mark on the scale shown in the figure indicates 2 µm. A photograph of that same diffuser taken with an optical microscope is shown in FIG. 7B. Three types of features are observable on this diffuser. One feature comprises circular-shaped indentations that have a diameter of 1.5-3 µm and a depth of approximately 1-2 µm. These features act as very strong diffusers. Another feature is the many small indentations that have a lateral size of 1 µm or smaller and a depth of 1 µm or smaller. This feature likewise is a strong diffuser for the 1-1.5 µm light. A third feature is much less dense than the other two features and consists of large and gradual indentations whose lateral size is 5-15 µm and whose depth is approximately 1 µm. This third feature produces less spreading of the shorter wavelength light compared to the spreading achieved by the other two features.

The Inventors have noted that for the longer-wavelength light (e.g., λL=10 µm), the third surface feature seen in the photographs of FIGS. 7A and 7B still acts as a moderately strong diffuser (1<S<2) because the refractive index of GaAs or InP is very large and because the lateral size of that feature is comparable to this optical wavelength. The lateral size of the other two features is much smaller than this longer wavelength and thus it is the spatial average (e.g., spatial density) of those features that affects the longer wavelength light. The spatial distribution of the first feature (the deeper circular indentations) is not uniform and thus the first feature also may produce some net spreading of the longer wavelength light. On another hand, for the spatial distribution of the second feature, the fine-scale indentations appears quite uniform on a 10 µm scale and would contribute only minimal spreading or diffusion of the longer wavelength light. According to an embodiment of the present disclosure, to achieve an improved wavelength selectivity, the dry-etching time can be reduced to reduce the depths of the indentations so that they are much shallower. According to an embodiment of the present disclosure, for InP, the indentations depth is preferably reduced to be at most 0.5 µm, where the lateral size of the indentations is smaller than one-third the longer wavelength and where the density of those indentations is not uniform.

The Inventors have noted that unmasked etching processes such as those used to form the diffuser surface features shown in the photographs of FIGS. 6A-D and 7A-B can produce random features having random lateral size and somewhat random height or depth. Alternatively, a diffuser according to an embodiment of the present disclosure can also be made by forming an engineered set of structures having a pseudo-random distribution of a limited set of sizes and spacing (or spatial locations). In such embodiments, the relief structures can be patterned deterministically by using masked etching.

Figure 8A:
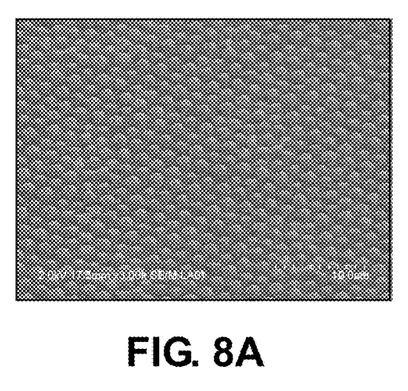
FIG. 8A shows a photograph in projection of a surface of a diffuser according to an embodiment of the present disclosure, having convex relief elements.
Figure 8B:
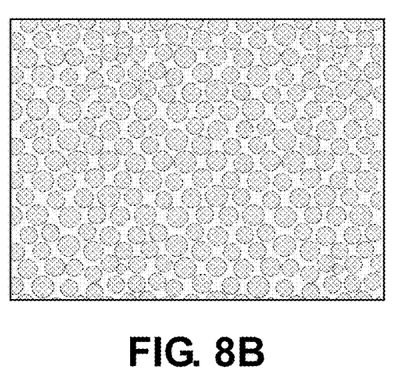
FIG. 8B shows the pseudo-random arrangement of the relief elements of the embodiment of FIG. 8A.

FIG. 8A shows an SEM photograph of rounded-top cones or domes according to an embodiment of the present disclosure; these cones or domes are formed by reactive-ion etching of a InP substrate using a lithographically patterned oxide mask layer followed by additional un-masked etching. The mask pattern used for the cones or domes can comprise an array of circular or polygonal shapes. Etching rounds the sharp corners of the polygons such that a more circular 3-dimensional conical or dome shape is produced. The dry-etching process parameters can be adjusted to achieve a desired etch depth (cone or dome height), a desired slope for the cone (or dome) sidewalls, and a desired undercut of the mask feature. According to an embodiment of the present disclosure, a pseudo-random pattern of cones (or domes) can be achieved by using a mask that has circles or polygons, of various size and spacing, such as illustrated in FIG. 8b.

According to an embodiment of the present disclosure, for the smallest circles or polygons defined on this mask, the mask layer could be completely undercut when the cones or domes are etched. Thus, the tips of the cones or domes defined by those smallest circles or polygons are lower than the tips of the cones or domes defined by the larger circles or polygons.

According to an embodiment of the present disclosure, to achieve the desired wavelength selectivity, the maximum spacing between the cones or domes can be kept to being no larger than three-times the shorter wavelength, whose light is to be diffused (e.g., smaller than 2-4 µm). According to an embodiment of the present disclosure, if the cones or domes are fabricated in InP (n≈3), the minimum height of the cones or domes can also be kept to being larger than 1/12th of the wavelength of the shorter-wavelength light to be diffused (e.g., greater than 0.13-0.2 µm for $\lambda_S$=1.5 µm), and preferably larger than 1/8th of that wavelength; the maximum height being preferably smaller than one 1/12th and preferably smaller than one-sixteenth of the wavelength of the longer-wavelength light (e.g., smaller than 0.6-0.8 µm for $\lambda_L$=10 µm), to ensure that the diffuser is weak for the longer wavelength light.

For a different n, the minimum height of the cones or domes can also be kept to being larger than $\lambda_S/(4 \cdot n)$ of the wavelength of the shorter-wavelength light to be diffused and preferably larger than $3\lambda_S/(8 \cdot n)$ of that wavelength; the maximum height being preferably smaller than $\lambda_L/(4 \cdot n)$ and preferably smaller than $3\lambda_L/(16 \cdot n)$ of the wavelength of the longer-wavelength light, to ensure that the diffuser is weak for the longer wavelength light.

The Inventors have noted that the angle spread produced by an etched diffuser is more like one produced by a Lambertian diffusive surface when the cones according to an embodiment of the present disclosure are more rounded and approach a paraboloid or dome shape, consistently with the plots in FIGS. 5A and 5B. According to an embodiment of the present disclosure, the tips of the cones can be rounded by using a subsequent unmasked, non-selective etch process such as a brief wet etching or ion-milling step. According to an embodiment of the present disclosure, a benefit of using a masked etching process to first define the surface features is the reproducibility of the diffusers that are fabricated.

The substrate of a diffuser according to the present disclosure can have parallel faces, such as in a plate, or can have non-parallel faces, such as in a prism or trapezoid-shaped substrate or even a cone or a lens-shaped substrate. Diffusers according to the present disclosure can have surface relief on a single face or on both faces of a substrate having parallel faces. Alternatively, diffusers according to the present disclosure can have surface relief on a single face or on multiple faces of for example a prism or trapezoid-shaped substrate.

According to an embodiment of the present disclosure, reflective diffusers can be formed by coating a face of a substrate that contains relief features such as described above with some reflective film, such as a metal film. The light to be diffused and reflected could be incident from the metal-coated side or from the substrate side of the structure.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A wavelength-selective optical diffuser comprising:
a substrate of a first material having a first surface, wherein said first material is transparent to a first wavelength $\lambda_S$ and a second wavelength $\lambda_L$, with $\lambda_L > 4 \cdot \lambda_S$;
said first surface of said substrate having a surface relief such that a beam of light having the first wavelength $\lambda_S$ is diffused, with a rms phase delay S>π/4, when traversing said substrate; and a beam of light having the second wavelength $\lambda_L$ is minimally diffused, with a rms phase delay S<π/4, when traversing said substrate;
where the rms phase delay S is the root-mean-square change in the phase of the light resulting from the surface relief of said first surface of the substrate, which has a root-mean-square variation in height described by $\sigma_h$, with:

$$S \simeq 2\pi \frac{\sigma_h}{\lambda}(n-1)$$

n being the refraction index of the substrate and λ the wavelength of illumination;
wherein the second wavelength $\lambda_L$ is comprised between 8 and 12 µm.

2. The wavelength-selective optical diffuser of claim 1, wherein said surface relief has a maximum width that is smaller than $\lambda_L/2$.

3. The wavelength-selective optical diffuser of claim 2, wherein said surface relief has a minimum width that is larger than $\lambda_S$.

4. The wavelength-selective optical diffuser of claim 2, wherein said surface relief has a minimum width that is larger than $\lambda_S/2$.

5. The wavelength-selective optical diffuser of claim 1, wherein said surface relief has a maximum height or depth that is smaller than $\lambda_L/(4 \cdot n)$, where n is the refractive index of said first material.

6. The wavelength-selective optical diffuser of claim 1, wherein said surface relief has a minimum height or depth that is larger than $\lambda_S/(4 \cdot n)$, where n is the refractive index of said first material.

7. The wavelength-selective optical diffuser of claim 1, wherein said surface relief is formed on one face of the substrate.

8. The wavelength-selective optical diffuser of claim 1, wherein said surface relief is formed on two opposing faces of the substrate.

9. The wavelength-selective optical diffuser of claim 1, wherein said surface relief includes protrusions and/or concave profiles.

10. The wavelength-selective optical diffuser of claim 9, wherein said protrusions and/or concave profiles form shapes including trenches, domes, cones, pyramids or bowls.

11. The wavelength-selective optical diffuser of claim 9, wherein a lateral dimension of said protrusions and/or concave profiles varies from one protrusion and/or concave profile to the next.

12. The wavelength-selective optical diffuser of claim 9, wherein said protrusions and/or concave profiles have a lateral coherence length of the surface-feature variation that is smaller than $3 \cdot \lambda_S$.

13. The wavelength-selective optical diffuser of claim 9, wherein said protrusions and/or concave profiles have a lateral coherence length of the surface-feature variation that is smaller than $\lambda_L/3$.

14. The wavelength-selective optical diffuser of claim 1, wherein said first material comprises a silica or polymer material, and wherein said surface relief comprises a random or pseudo-random pattern of cones, pyramids, rounded or convex bumps.

15. The wavelength-selective optical diffuser of claim 1, wherein said first material has high optical transparency for all wavelengths between 1 μm and 12 μm.

16. The wavelength-selective optical diffuser of claim 1, wherein said first material comprises InP or GaAs, and wherein said surface relief comprises a random or pseudo-random pattern of cones, pyramids, rounded or convex bumps.

17. The wavelength-selective optical diffuser of claim 1, wherein the first wavelength $\lambda_S$ is comprised between 1 and 2 μm.

18. A method of fabricating a wavelength-selective optical diffuser; the method comprising:
providing a substrate of a first material having a first surface, wherein said first material is transparent to a first wavelength $\lambda_S$ and a second wavelength $\lambda_L$, with $\lambda_L > 4 \cdot \lambda_S$;
forming on at least a first surface of said substrate a surface relief such that a beam of light having the first wavelength $\lambda_S$ is diffused, with a rms phase delay $S > \pi/4$, when traversing said substrate; and a beam of light having the second wavelength $\lambda_L$ is minimally diffused, with a rms phase delay $S < \pi/4$, when traversing said substrate;
where the rms phase delay S is the root-mean-square change in the phase of the light resulting from the surface relief of said first surface of the substrate, which has a root-mean-square variation in height described by $\sigma_h$, with:

$$S \simeq 2\pi \frac{\sigma_h}{\lambda}(n-1)$$

n being the refraction index of the substrate and λ the wavelength of illumination;
wherein the second wavelength $\lambda_L$ is comprised between 8 and 12 μm.

19. The method of claim 18, wherein said surface relief has a maximum height or depth that is smaller than $\lambda_L/(4 \cdot n)$, where n is the refractive index of said first material.

20. The method of claim 18, wherein said surface relief has a maximum width that is smaller than $\lambda_L/2$.

21. The method of claim 20, wherein said surface relief has a minimum width that is larger than $\lambda_S$.

22. The method of claim 20, wherein said surface relief has a minimum width that is larger than $\lambda_S/2$.

23. The method of claim 18, wherein said surface relief has a minimum height or depth that is larger than $\lambda_S/(4 \cdot n)$, where n is the refractive index of said first material.

24. The method of claim 18, wherein said surface relief includes protrusions and/or concave profiles.

25. The method of claim 23, wherein said protrusions or concave profiles have a lateral coherence length of the surface-feature variation that is smaller than $3 \cdot \lambda_S$.

26. The method of claim 23, wherein said protrusions or concave profiles have a lateral coherence length of the surface-feature variation that is smaller than $\lambda_L/3$.

27. The method of claim 18 wherein said first material comprises GaAs, said forming a surface relief comprising performing an unmasked wet chemical etching of said first surface.

28. The method of claim 18 wherein said first material comprises InP, said forming a surface relief comprising performing an unmasked reactive ion etching of said first surface.

29. The method of claim 18, comprising:
forming said surface relief by masked reactive ion etching using a mask containing features of non-uniform size and spacing.

30. The method of claim 29, further including:
performing a unmasked dry etching following the masked reactive ion etching.

31. A method for separating light comprising a first component having a first wavelength $\lambda_S$ and a second component having a second wavelength $\lambda_L$, with $\lambda_L > 4 \cdot \lambda_S$, into a first beam of diffused light having the first wavelength $\lambda_S$ and a second non-diffused or minimally diffused beam component having the second wavelength $\lambda_L$; the method comprising:
fabricating a wavelength-selective optical diffuser according to the method of claim 18; and
directing light comprising said first and second components at said wavelength-selective optical diffuser.

32. The method of claim 18, wherein the first wavelength $\lambda_S$ is comprised between 1 and 2 μm.

* * * * *